United States Patent
Puuskari et al.

(10) Patent No.: US 7,330,439 B1
(45) Date of Patent: Feb. 12, 2008

(54) PACKET DATA TRANSMISSION IN THIRD GENERATION MOBILE SYSTEM

(75) Inventors: Mikko Puuskari, Helsinki (FI); Tuija Hurtta, Espoo (FI); Juha Kalliokulju, Vesilahti (FI); Tero Makela, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/980,541

(22) PCT Filed: May 21, 1999

(86) PCT No.: PCT/EP99/03517

§ 371 (c)(1),
(2), (4) Date: Feb. 14, 2002

(87) PCT Pub. No.: WO00/72518

PCT Pub. Date: Nov. 30, 2000

(51) Int. Cl.
*H04J 1/16* (2006.01)
*H04J 3/16* (2006.01)
*H04Q 7/24* (2006.01)
*H04L 12/28* (2006.01)

(52) U.S. Cl. .................. 370/252; 370/338; 370/394; 370/465

(58) Field of Classification Search ........... 370/252, 370/389, 394, 446, 474, 231
See application file for complete search history.

(56) References Cited

U.S. PATENT DOCUMENTS

| | | | |
|---|---|---|---|
| 6,636,502 B1 * | 10/2003 | Lager et al. | 370/352 |
| 6,658,011 B1 * | 12/2003 | Sevanto et al. | 370/401 |
| 6,937,566 B1 * | 8/2005 | Forslow | 370/231 |
| 7,023,825 B1 * | 4/2006 | Haumont et al. | 370/338 |

FOREIGN PATENT DOCUMENTS

WO  WO 97/22201   6/1997

OTHER PUBLICATIONS

3rd Generation Partnership Project; Technical Specification Group Services and System Aspects, QoS Concept, 3G TR 23.907 1.1.0 (May 1999).

* cited by examiner

*Primary Examiner*—Chau Nguyen
*Assistant Examiner*—Nittaya Juntima
(74) *Attorney, Agent, or Firm*—Squire, Sanders & Dempsey L.L.P.

(57) ABSTRACT

A method and network elements for transmission of data packets in a data packet network, wherein at least a delivery order attribute (DOA) is detected as a parameter for transmission of data packets, and whether the DOA parameter is set is determined. If the DOA parameter is set, a traffic class of transmitted data packets is determined and the transmitted data packets are processed dependent on the determined traffic class. In addition, a method is used to set the DOA as a parameter for transmission of data packets in a packet data network.

44 Claims, 5 Drawing Sheets

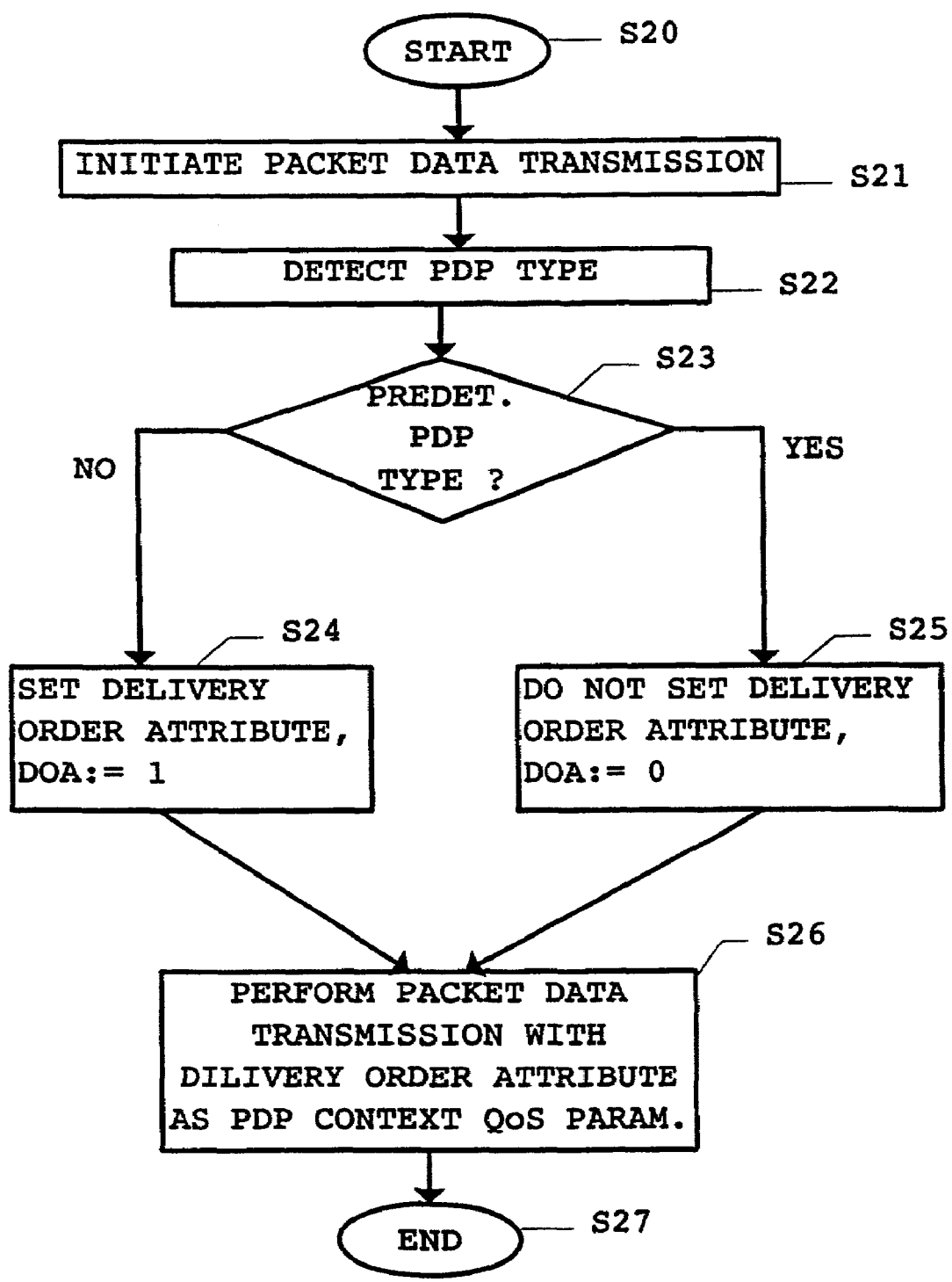

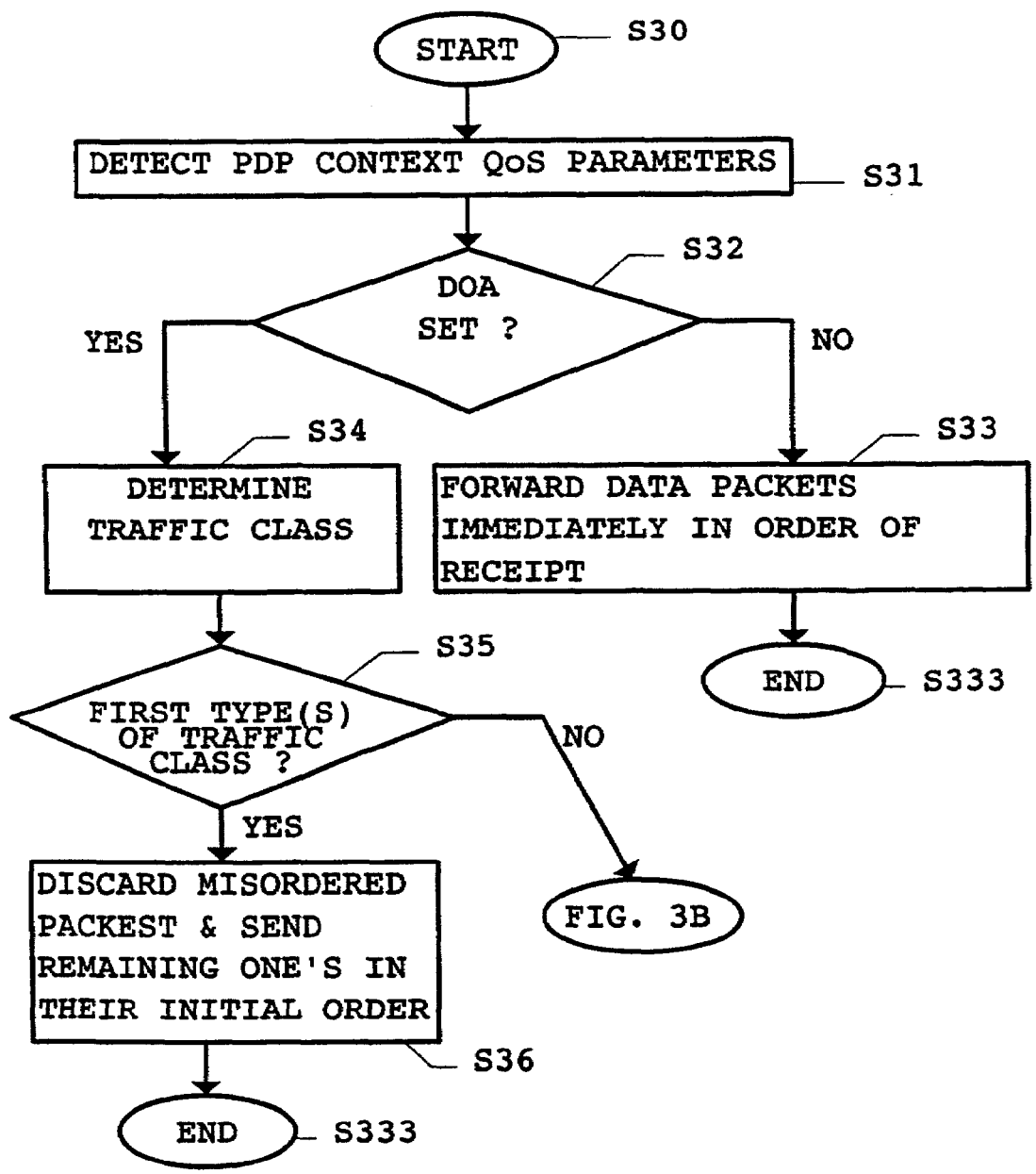

PACKET DATA TRANSMISSION IN THIRD GENERATION MOBILE SYSTEM

PRIORITY CLAIM

This is a U.S. national stage of PCT application No. PCT/EP99/03517, filed on May 21, 1999.

FIELD OF THE INVENTION

The present invention relates to a method for setting a delivery order attribute as a parameter for transmission of data packets in a packet data network, to a method for transmission of data packets in a packet data network, and to a network element for controlling transmission of data packets in a packet data network which network element is adapted to operate according to the latter.

Particularly, the present invention concerns such methods and network elements in connection with the UMTS being currently developed (UMTS=Universal Mobile Telecommunication System), and more specifically, to PDP context QoS parameters and their derivation from available information as well as there use. (PDP=Packet Data Protocol, QoS=Quality of Service).

BACKGROUND OF THE INVENTION

Recently telecommunication has made considerable progress. A part of this progress manifests in the fact that a user may access different networks from a single terminal device such as a mobile station MS, and transmit/receive different kinds of data from/with said terminal.

For example, a considerable progress represents the possibility to access the Internet from one's mobile station and to perform data transfer between the Internet and one's mobile station.

Such data transfers rely on packet data transmission, according to which data are transmitted in units of packets. An example for a packet data network enabling such a packet data transmission is the GPRS network GPRS-NW roughly illustrated in FIG. 1. (GPRS=General Packet Radio Service) for explanatory purposes. FIG. 1 shows a third generation GPRS network part (3G-GPRS) in the UMTS and the respective corresponding GPRS components.

Packet data are for example sent from an external network such as the Internet (or the PSTN=Public Switched Telephone Network) to a terminal device of a user such as a mobile station MS (downlink DL transmission), or vice versa (uplink UL transmission). The subsequent brief explanation of packet data transmission will now refer to the downlink DL transmission.

The connection between the UMTS (GPRS part) network UMTS and the external network is established via a so-called 3G-GGSN (=$3^{rd}$ generation Gateway GPRS Support Node). The 3G-GGSN as a network element transfers the received data via a 3G-SGSN (=$3^{rd}$ generation Serving GPRS Support Node) (this is optionally, since a GGSN may also act as a SGSN in future UMTS standards releases, although at present a SGSN is mandatory) to a (radio) network controller device RNC (in UMTS; corresponding to a base station controller BSC in GPRS) adapted top control a (radio) access network consisting of at least one Node B (in UMTS) (which corresponds to a base transceiver station BTS in GPRS) (in case of a radio access network). The access network then accesses and communicates with the user's terminal MS.

In downlink DL, the RNC controls the forwarding of data packets to the mobile station as the destination, while in uplink the GGSN controls the forwarding of data packets to the external network as the destination.

When forwarding such data packets via the packet data network such as a GPRS network, the provisioning of a sufficient quality of the service i.e. the transmission of data packets, is essential. This is referred to as QoS.

Provisioning of QOS in GPRS phase 1 could not be successfully established. In a subsequent GPRS phase 2, and therefore also in a UMTS network, data packets can be transmitted using different transmission protocol types. For example, the following protocol types are supported: UDP (User Datagram Protocol), mostly used for real time applications; TCP (Transmission Control Protocol), PPP (Point to Point Protocol), X.25 protocol, IP (Internet Protocol), OSP: IHOSS (Octet Streaming Protocol:Internet Hosted Octet Streaming Service).

All of these PDP types underlie respective different requirements. Also, different applications (e.g. real-time applications and/or non-real time applications) can be run on top of the PDP contexts of the above mentioned PDP types. However, different applications will require a respective different service from the network.

For example, the X.25 protocol requires the data packets to be sent reliable and delivered in-order, i.e. in the same sequence as they were initially transmitted/forwarded. PPP protocol, on the other hand, requires a less reliable transmission, i.e. some data packets can be lost without significantly affecting QoS, but the data packets not lost have to be delivered in-sequence. Still further, IP protocol based transmissions do neither have to preserve the order of the sent packets nor to be reliable in the sense that no data packets are to be lost.

For this purpose, a delivery order attribute as a PDP context QoS parameter has recently been defined. To be included in a set of UMTS bearer QoS parameters. These parameters are still subject to a non-concluded standardization process. A delivery order attribute is defined in 3GPP, Technical Specification Group Services and System Aspects, QoS Concept (3G TR 23.907; May 1999, version 1.1.0).

The delivery order attribute parameter (DOA) defines for UMTS if the order of transmitted packets has to be maintained or not. In case the order is to be maintained, this leads to the necessity of a node or network element of the network (GPRS comparable part of UMTS) to rearrange the received (disordered) data packets to thereby reconstruct the initial sequence of the data packets as they were sent.

However, this additional parameter is hard to define by an end-user who can be expected not to be an expert in telecommunication networks. Namely, such a "normal" end-user presumably does not know whether such a property (of in-order packets) is necessary for an activated service and/or how the property affects the operation.

Moreover, in order to support different applications on top of the UMTS bearer, four traffic classes have been developed. Namely, a conversational, streaming, interactive and background traffic class, respectively.

PDP types mentioned above are independent of the traffic classes. Stated in other words, each PDP type (protocol type) may run over several traffic classes. IN addition, the selection of traffic class sets some requirements for the handling of the prevailing traffic in terms of scheduling and/or buffering of transmitted data packets. Also, a delivery order is defined in each traffic class, but this is currently not in line with the requirements imposed to the traffic classes.

Further prior art is known from document WO 97/22201.

SUMMARY OF THE INVENTION

Hence, it is an object of the present invention to optimize data packet transmission for different service while simplifying a user interface required for configuring services available to a user.

According to a first aspect of the present invention, this object is achieved by a method for setting a delivery order attribute as a parameter for transmission of data packets in a packet data network, said method comprising the steps of: establishing mapping information for delivery order attributes corresponding to different transmission protocol types, detecting a transmission protocol type for the transmission of data packets, deciding whether said detected protocol type is a predetermined type, and setting, based on said mapping information and said decision result, the delivery order attribute in case the predetermined protocol type is decided to be not present.

According to a second aspect of the present invention, this object is achieved by a method for transmission of data packets in a packet data network, said method comprising the steps of: detecting at least a delivery order attribute as a parameter for transmission of data packets; deciding, whether said delivery order attribute parameter is set; and if so determining a traffic class of the transmitted data packets, and processing the transmitted data packets dependent on the determined traffic class.

Still further, this object is achieved by a network element for controlling transmission of data packets in a packet data network, said network element comprising: first detecting means adapted to detect at least a delivery order attribute as a parameter for transmission of data packets; first deciding means adapted to decide whether said delivery order attribute parameter is set; first determining means responsive to a positive decision result and adapted to determine a traffic class of the transmitted data packets, and processing means adapted to process the transmitted data packets dependent on the determined traffic class.

Favorable refinements of the present invention are as set out in respective dependent claims.

According to the first aspect of the present invention, the delivery order attribute is set according to a PDP type, i.e. a transmission protocol type. Thus, the value of the delivery order attribute is derived without necessitating an interaction of the end-user. The parameter is thus hidden from the end-user, which makes the design of the user interface UI more simple.

According to the second aspect of the present invention, data packets are transmitted/forwarded based on a combined evaluation of the delivery order parameter and the traffic class. Namely, this aspect of the invention proposes that the way the delivery order is maintained depends on the traffic class of a connection. For example, for real-time RT connections and RT traffic classes, delayed data packets $P_k$ which are received after a packet $P_i$ (i>k) are discarded, while for non-real-time NRT connections, packets are buffered and reordered. This is done in case the delivery order is required to be maintained. Stated in other words, NRT packet delivery is both, in-sequence (if required) and more reliable. In summary, a reordering process for data packets is optimized for different services.

BRIEF DESCRIPTION OF THE DRAWINGS

The present invention will be described in the following with reference to the drawings, in which

FIG. 2 is a flowchart explaining a first aspect of the present invention in greater detail;

DETAILED DESCRIPTION OF EMBODIMENTS OF THE INVENTION

Figure 1:
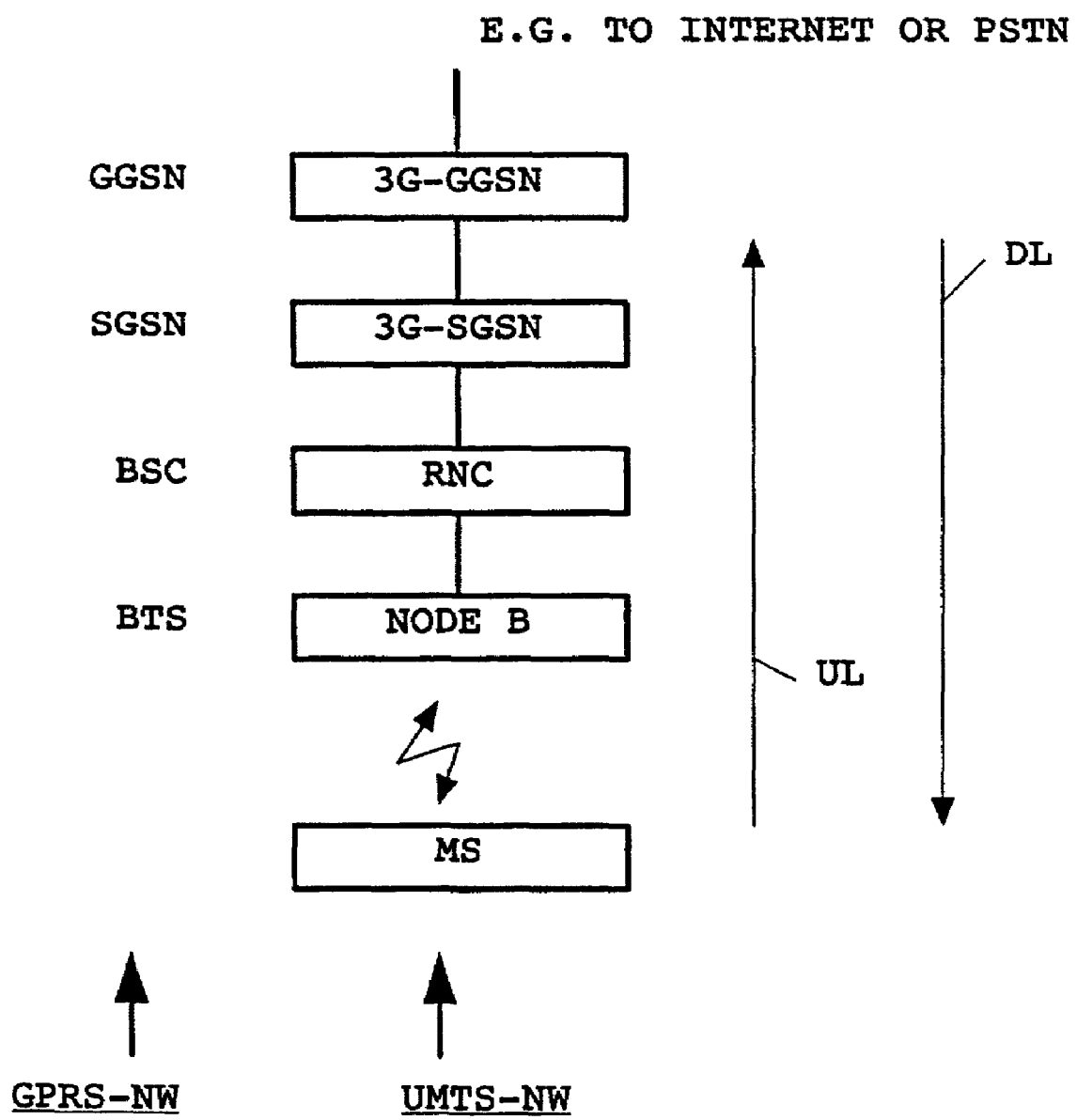
FIG. 1 illustrates a simplified block diagram of a GPRS network and/or corresponding functional units of a UMTS.

According to a first aspect of the present invention, the delivery order attribute DOA is derived from a PDP type, i.e. transmission protocol type, respectively. For example, considering a case of traffic, i.e. transmission of data packets relying on UDP protocol, which in most cases is used for real time traffic. In connection with real time traffic, it is preferred to discard some data packets instead of starting buffering of data packets and waiting for individual packets that are lost or at least received with delay. In such a case, the delivery order attribute should not be set, i.e. should for example be set to a value of zero indicating that the data packets need not be delivered/forwarded in the sequential order in which they were initially transmitted (ordering not required). On the other hand, PPP and X.25 protocols, for example, are used to run applications which require or at least benefit from packets being delivered/forwarded (i.e. received at the destination) in their initial order (sequence) in which they were transmitted from the sender side. Moreover, TCP, which does not require that the delivery order is being kept, will benefit from the delivery order being maintained. Also in such a case, the PDP type, namely the protocol type, can be used to decide whether the delivery order attribute is to be set, and if such a protocol type is present, the delivery order attribute is set to a value indicating that a delivery of data packets is required in sequence (the initial sequence of sending). New radio interface such as MAC (Medium Access Control)/RLC (Radio Link Control) defined in UMTS require to be configured to deliver data packets either to be in order to deliver data packets not necessarily in order, i.e. out of order delivery is permissible.

FIG. 2 shows a more detailed flow chart of this proposed method for setting a delivery order attribute as a parameter for transmission of data packets in a packet data network.

The method starts in a step S20, which is followed by an initiation of packet data transmission in step S21.

Thereafter, in step S22, a PDP type is detected after a mapping information has been established, which mapping information has been established for delivery order attributes corresponding to different transmission protocol types. Namely, information regarding the used transmission protocol type (and associated delivery order attributes) is acquired.

In a following step S23 it is then decided, whether the detected protocol is a predetermined one. Also, this is intended to mean that it is decided whether the detected protocol is part of a predetermined group of protocols (a group of protocols in the simplest case consists of one protocol only). That is, there exist different protocols of which part require in-sequence delivery and part do not require in-sequence delivery. A predetermined type of protocol referred to herein below refers to a protocol or a set of protocols which do not require in-sequence delivery.

If a predetermined type of protocol is decided to be present (YES in step S23), the flow branches to step S25. Stated in other words, steps S22 and S23 detect a PDP type and decide whether it requires in-sequence delivery or not. This may be the case in the event that UDP as a protocol for real-time transmission has been detected to be present, as mentioned before. Then, in step S25, the delivery order attribute is not set, i.e. assumes a value of zero, for example.

On the other hand, if said predetermined type has not been detected (NO in Step S23) (e.g. a type has been detected which is not used for RT but rather for NRT transmissions), the flow branches to step S24. IN step S24, the delivery order attribute is set to a value (e.g. DOA=1) indicating that delivery of data packets is required in sequence (the initial sequence of sending)

After step S24 as well as after step S25, the flow is combined and proceeds with a step S26. In step S26, the packet data are transmitted together with the delivery order attribute DOA (being set (DOA=1) or not set (DOA=0)).

The flow then ends in step S27.

As a still further alternative (not shown in the Figure), if due to the automatic setting of the delivery order parameter some advantageous other properties of transmission are adversely affected (e.g. transmission quality falls below a predetermined quality threshold), the final decision as to the setting of the DOA parameter may be left to the user again, or the parameter may be set to a fixed value.

According to a second aspect of the invention, the above set/or non-set delivery order attribute is evaluated in the course of transmitting data packets. Specifically, the transmission is based on the combined evaluation of PDP type requirements and traffic classes, so that a proper handling of the delivery order parameter in a respective traffic class is resulting therefrom.

In brief, because in real-time traffic classes the data packet scheduling and forwarding must be fast, i.e. real-time with hardly any buffering, there cannot be buffering of data packets even if the packets are received in a wrong order while an in-sequence delivery of the data packets is required (i.e. the delivery order parameter DOA is set, DOA=1, for the PDP context, namely the protocol type).

Packets being received out of order are deleted and/or discarded. SO, for example, for a packet stream of #1, #2, #3, #5, #6, #4, #7, #8 being received, packet #4 will be deleted.

On the other hand, in connection with non-real-time traffic, it makes sense to wait for some time for data packets not yet arrived in order to be able to reorder the flow of packets. As a specific example only, the ordering is based on sequence numbers contained in GTP headers (GPRS Tunneling Protocol) of the data packets. Nonetheless ordering can be based on RLC numbering in the radio interface, i.e. on the information contained in an RLC header, as a further example. Generally, this can be based on the information contained in any header, as long as the respective header contains an indication related to the sequence of the packets.

Therefore, according to the second aspect of the present invention the delivery/forwarding, i.e. transmission of data packets is proposed to be handled as follows:

I.) Conversational and Streaming Traffic Classes (More Generally: a First Type of Traffic Class or First Type Group of Traffic Classes)

If a delivery order attribute is not set, all incoming data packets are forwarded immediately (or at least as soon as possible).

However, in case the delivery order attribute has been set, a network element (e.g. RNC in downlink direction, GGSN in uplink direction of transmission) checks the order of, i.e. a sequential relationship among data packets before they are forwarded to a respective destination (mobile station terminal in downlink, external network such as Internet in uplink). (It should be noted that the check could also be conducted by the closest network node after transmission, so e.g. by the SGSN.) If a data packet (or more than one) arrives after the subsequent packet (with reference to the initial order of the packets upon sending), and the data packets arrive thus in a wrong order, the disordered packet(s) is/are discarded to thereby preserve the right order of packets, since buffering and waiting for possibly disordered data packets does not make sense in case with this real-time traffic related traffic class.

II.) Interactive and Background Traffic Class (More Generally: a Second Type of Traffic Class or Second Type Group of Traffic Classes)

If a delivery order attribute is not set, all incoming data packets are forwarded immediately (or at least as soon as possible). (In this connection, the behavior is similar to the first class.)

In case the delivery order attribute parameter has been set, the network element (e.g. RNC in downlink direction, GGSN in uplink direction of transmission) checks the order of, i.e. a sequential relationship among data packets before they are forwarded to a respective destination (mobile station terminal in downlink, external network such as Internet in uplink).

If a data packet is missing, the (next) data packets will be buffered and the missing data packet will be waited for, at least for a specified waiting time also referred to hereinafter as a buffering time window. This is for example controlled by a timing device which controls buffering and waiting. When the timer expires, i.e. the buffering time window has lapsed, the buffered data packets buffered so far are sent and a possibly disordered data packet is dropped or discarded even if it arrives later. In case the missing data packet arrives prior to the lapse of the buffering time window, the buffer can be emptied and the sending/forwarding is continued until a next packet is missing. In this case, of course, the buffered data packets are reordered and sent in their initial sequence, with the reordering being based on the sequence number contained in the a header such as the GTP header or RLC header (or any other suitable header containing such sequence number information) of the packets.

This ensures, that during most time of the transmission, the NRT (non real time) packet delivery is effected both, in sequence (if required) and reliable (in that only few data packets are missing and transmission quality is not degraded due to a disordered data stream at the destination). A delay caused in this case does not cause a remarkable deterioration since NRT can cope with delays and even with variations in delay.

In addition to traffic class information mentioned above, also bit error rate (BER) and/or packet loss ratio parameter values may be referred to in order to influence the decision as to whether data packets are to be buffered or not for a certain PDP context, i.e. transmission protocol. Also, a combined consideration of the previous attribute values and a Maximum transfer Delay value may be used to define an appropriate value for the buffering time window (and/or buffer size).

FIG. 3 now shows a more detailed flow chart of this proposed method for transmission of data packets in a packet data network according to the invention.

With reference to FIG. 3A, the method starts in a step S30. Thereafter, in step S31, PDP context QoS parameters are detected. Among such parameters, at least a delivery order attribute parameter DOA is detected.

In step S32, it is decided whether said delivery order attribute DOA is set or not. If said delivery order attribute DOA is not set (NO in step S32), the flow branches to step S33. According to step S33, data packets are forwarded immediately (or at least as soon as possible) in the order of their receipt to the destination. Then, the flow ends in a subsequent step S333.

If however, it is decided in step S32, that the DOA parameter is set (YES in step S32), the flow proceeds to step S34.

In step S34, a traffic class of the prevailing traffic is determined. The subsequent processing is dependent on the determined traffic class.

Namely, in a following step S35, it is decided whether the determined traffic class is a predetermined one (or belongs to a predetermined group of traffic classes, e.g. RT or NRT traffic classes). More precisely, in step S35 it is decided whether the determined traffic belongs to a first type of traffic class (or traffic classes). In the chosen example, this first type of traffic class(es) is defined to represent a real-time traffic class.

If this is confirmed in step S35 (YES in step S35), namely, if said traffic is RT traffic such as conversational/streaming traffic, the flow branches and proceeds with step S36. In step S36, disordered packets are discarded and only the remaining packets are sent/forwarded to the destination in their initial order in which they were sent. For example, if a stream of data packets of packets #1, #2, and #3 is initially sent in this order, and packets are received by the network element in the course of transmission to the destination such as a mobile station MS in the order #1, #3, and #2, the disorder is detected due to the comparison of header information for the packets (e.g. information included in the GTP header, RLC header or any other suitable header), packet #2 is discarded and only packets #1 and 3 (thus in their correct order) are forwarded further to the destination. The flow then ends in a step S333.

Figure 3B:
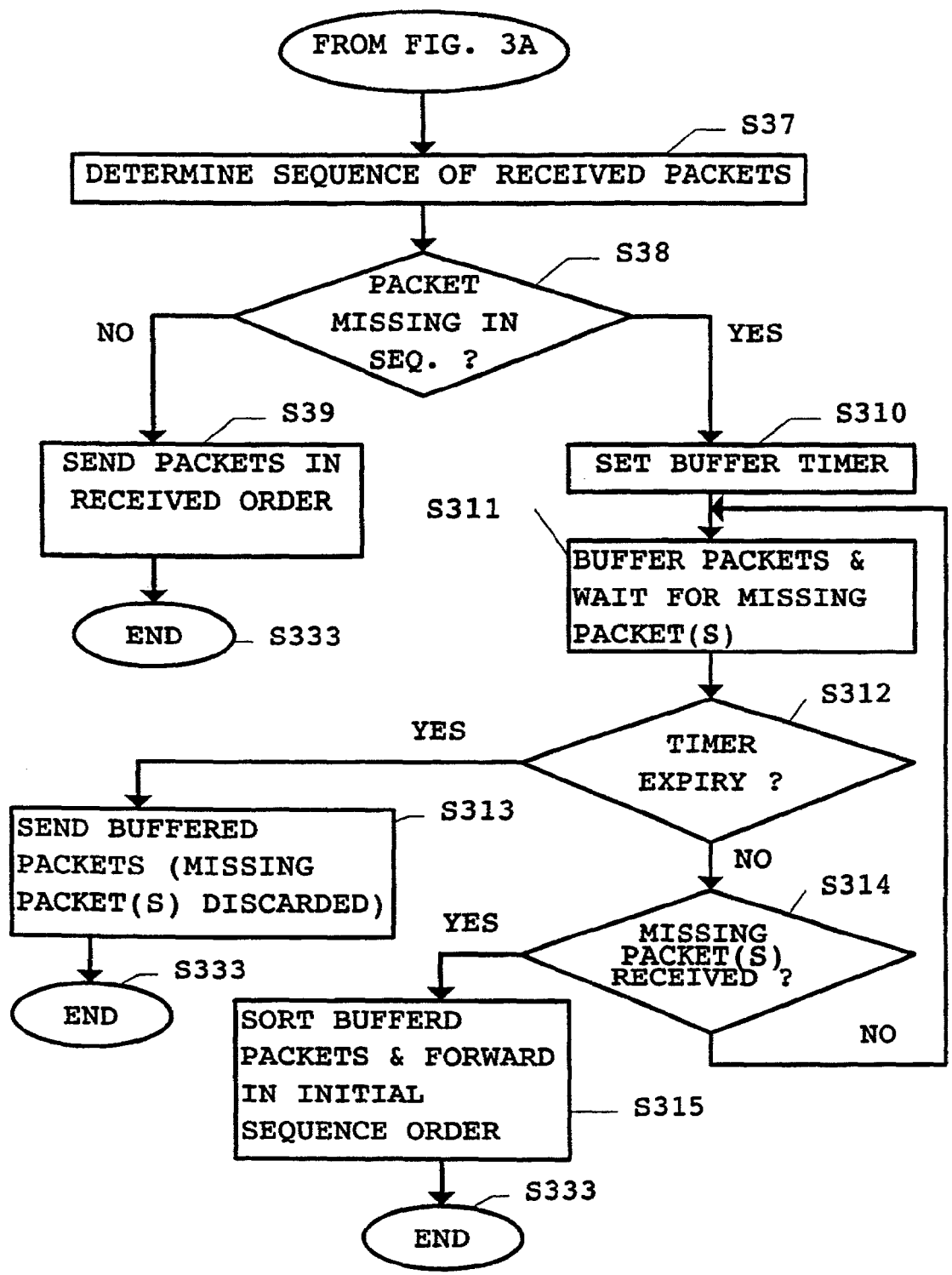
FIG. 3 (FIGS. 3A & 3B) is a flowchart explaining a second aspect of the present invention in greater detail.

In contrast, if in step S35 a predetermined first type of traffic is not decided to be present, i.e. in the described example, NRT traffic is concluded to be present, the flow advances to step S37 (see FIG. 3B).

According to step S37 the sequence of received data packets is determined, i.e. a sequential relationship among the received packets is monitored. In a subsequent step S38, it is detected whether a data packet is missing in the sequence of received/monitored data packets.

With reference to the above example, it is checked whether packets #1, #2, and #3 . . . are received in this order or whether for example packet #2 is missing.

If no such packet is missing (NO in step S38), the flow branches to step S39 and the received packets are sent/forwarded in the received order (which in this case is also the order of initial sending thereof). The flow then ends in step S333.

If, however, a packet is missing (e.g. packet #2) (YES in step S38), the method proceeds with step S310.

In step S310, a buffer timer is set, thereby setting a buffering time window, during which time window received data packets are buffered. The received data packets are buffered in step S311 and it is waited for the receipt of the missing data packet (or packets). During the waiting, it is checked, whether the timer has expired (the time window has lapsed or not.

If the timer has expired (YES in step S312), the flow proceeds to step S313, where the buffered data packets are sent/forwarded from the buffer to the destination. This implies that the missing data packets, if still received later, are discarded. With reference to the example given in connection with the three packets, if packet #2 is not received during the buffering time window, only packets #1 and #3 are forwarded and packet #2 is discarded if received later. The flow then ends in step S333. (it should be noted that the discarding of "late-received", i.e. disordered packets such as packet #2 is not necessary in all cases, so that in the given example there might be cases in which packet #2 is also sent to the destination.)

If, however, the timer has not expired (NO in step S312), the flow proceeds to step S314, where it is checked whether a missing data packet (or plural missing packets) have been received.

If the packet(s) is(are) received (YES in step S314), the flow proceeds to step S315. In step S315 the buffered data packets are reordered to their initial sequence order (based on the sequence number information contained in a suitable header such as for example the GTP header, RLC header, LLC header, SNDCP header (layer on top of LLC in GPRS), etc.) and forwarded in their initial sequence order.

Referring to the given example, if packets #1 and #3 have been buffered and packet #2 is received during the buffering time window so that packets #1, #3, and #2 are present, these are reordered and forwarded in their initial sending sequence order of packets #1, #2, and #3 to their destination.

If, however, the packets are not received (NO in step S314) the flow returns to step S311, and buffering and waiting for missing packets continues until either the timer expires or the missing packet(s) is(are) received.

The preceding detailed description has been given with particular reference to the method. However, the present invention also relates to a corresponding device and/or network element for controlling transmission of data packets in a packet data network, said network element comprising a first detecting means adapted to detect at least a delivery order attribute as a parameter for transmission of data packets, a first deciding means adapted to decide whether said delivery order attribute parameter is set, a first determining means responsive to a positive decision result and adapted to determine a traffic class of the transmitted data packets, and a processing means adapted to process the transmitted data packets dependent on the determined traffic class.

Figure 4:
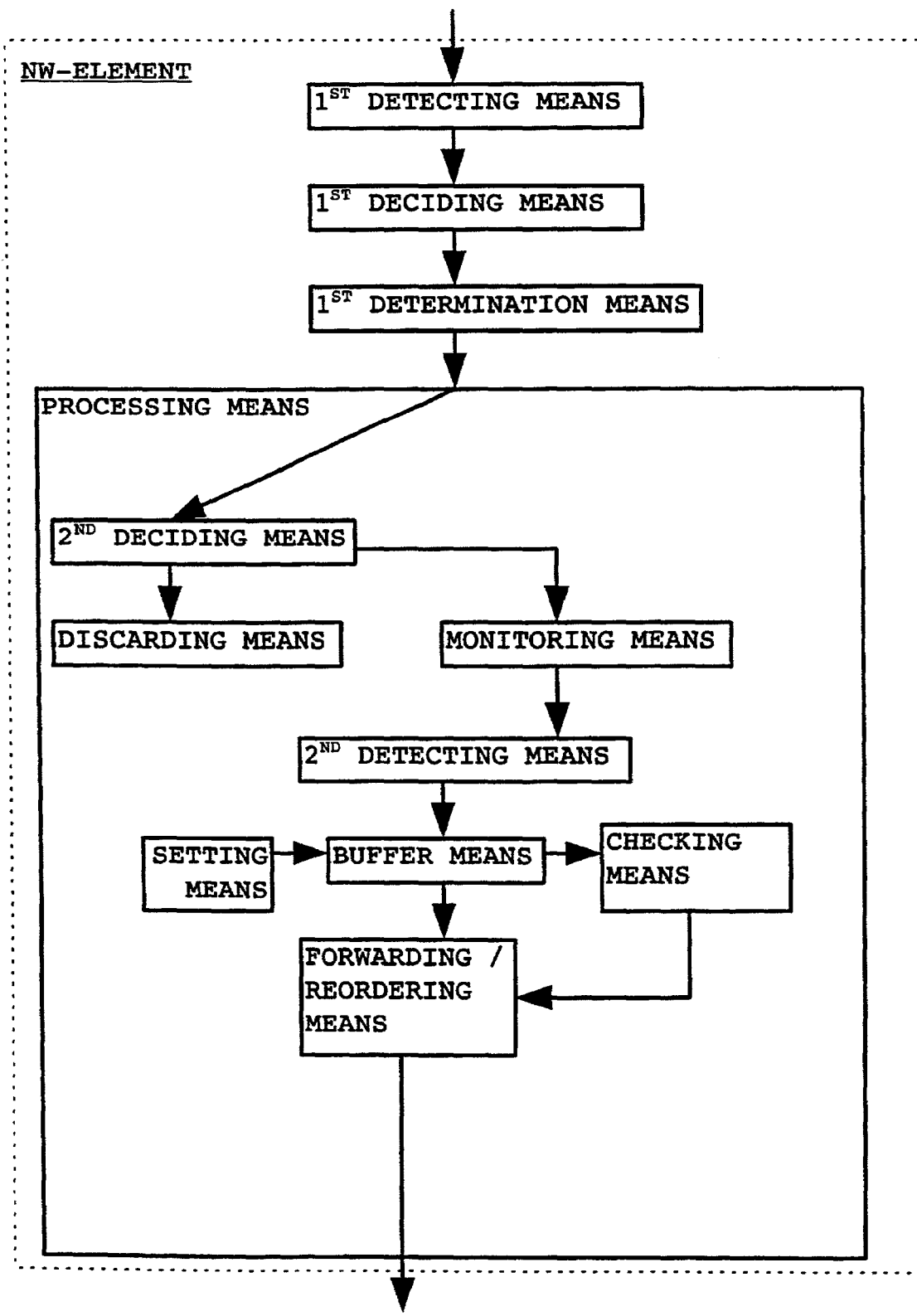
FIG. 4 shows a block diagram of a network element according to the present invention.

In detail, such a network element NW-ELEMENT is shown in FIG. 4 of the enclosed drawings. Transmitted data packets are supplied to the network element and input to a first detecting means, which is connected to a first deciding means, which in turn is connected to a first determination means and a subsequent processing means.

The processing means as such comprises, as shown in the lower part of FIG. 4, a second deciding means connected to a discarding means and a monitoring means which are responsive to respective decision results of said second deciding means.

The monitoring means as such is connected to a second detecting means, an output signal of which is supplied to a buffer means. The buffer means buffers the data packets supplied thereto via an input (not shown) responsive to the signal supplied from the second detecting means. The buffer means is set from by means of a setting means, while a checking means checks the buffer means in regard of packets and/or the order of packets buffered therein.

The data buffered are read out from the buffer means and supplied to a forwarding/reordering means which either forwards the buffered data or reorders the buffered data packets dependent on a control signal supplied to the forwarding/reordering means from the checking means. (The processing as performed by these latter means is substantially the one as described in connection with the flowchart FIG. 3B, particularly steps S311 to S315.)

The location of such a device/network element within the network is dependent on the transmission direction of the data packets. For example, in connection with downlink DL transmission, the device will be implemented as part of the RNC as a network element, while in connection with uplink traffic, the device will be implemented as part of the GGSN as a network element.

It is apparent to those skilled in the art that each of the methods steps and its functionality as described herein before can be transferred to a corresponding hardware means adapted to perform the same functionality as described in connection with the method step, so that a detailed description of a correspondingly adapted device is considered to be dispensable.

As has been described herein before, the present invention proposes a method for transmission of data packets in a packet data network, said method comprising the steps of: detecting S31 at least a delivery order attribute DOA as a parameter for transmission of data packets; deciding S32, whether said delivery order attribute parameter is set; and if so determining S34 a traffic class of the transmitted data packets, and processing the transmitted data packets dependent on the determined traffic class S35 to S315. Also, the present invention is directed to correspondingly adapted network elements. Furthermore, the invention concerns a method for setting a delivery order attribute DOA as a parameter for transmission of data packets in a packet data network.

It should be understood that the above description and accompanying figures are merely intended to illustrate the present invention by way of example only. The preferred embodiments of the present invention may thus vary within the scope of the attached claims.

The invention claimed is:

1. A method comprising:
    establishing mapping information for delivery order attributes corresponding to different transmission protocol types;
    detecting a transmission protocol type for the transmission of data packets;
    deciding whether said detected protocol type is a predetermined type; and
    setting, based on said mapping information and said decision result, the delivery order attribute (DOA) as a parameter for transmission of data packets in a packet data network if the predetermined protocol type is not present.

2. The method of claim 1, wherein said set delivery order attribute (DOA) indicates that the order of transmitted data packets is to be maintained.

3. The method of claim 1, wherein said delivery order attribute (DOA) is not set if the predetermined protocol type is present.

4. The method of claim 3, wherein an unset delivery order attribute indicates that the order of transmitted data packets does not need to be maintained.

5. The method of claim 1, wherein said predetermined protocol type comprises a protocol type used for real-time transmission.

6. The method of claim 1, wherein said transmission protocol type is derived from packet data protocol (PDP) context information or packet data protocol (PDP) type information.

7. A method comprising:
    detecting at least a delivery order attribute (DOA) as a parameter set for a transmission protocol type used for transmission of data packets;
    deciding whether said delivery order attribute parameter is set for said protocol type; and
    determining a traffic class of the transmitted data packets, and processing the transmitted data packets dependent on the determined traffic class if the delivery order parameter is set.

8. The method according to claim 7, wherein if said delivery order attribute is set, then the order of transmitted data packets is to be maintained.

9. The method of claim 7, wherein if said delivery order attribute is not set, then the order of transmitted data packets does not need to be maintained.

10. The method according to claim 9, wherein data packets to be transmitted are forwarded to their destination immediately and irrespective of the traffic class.

11. The method of claim 7, further comprising:
    deciding whether a determined traffic class is a predetermined traffic class; and
    if the traffic class is a predetermined traffic class, discarding received data packets which are received after subsequently sent data packets.

12. The method according to claim 7, further comprising:
    deciding whether a determined traffic class is a predetermined traffic class; and
    if the determined traffic class is not a predetermined traffic class, monitoring a sequential relationship among received data packets, detecting whether a data packet is missing in the monitored sequence, and in response to the detection of a missing data packet, buffering received data packets.

13. The method of claim 12, further comprising:
    setting a buffering time window, during which time window received data packets are buffered.

14. The method of claim 13, further comprising:
    checking to determine whether the missing data packet is received during the buffering time window.

15. The method of claim 14, wherein if said missing data packet is not received during the buffering time window, said buffered data packets are forwarded irrespective of the missing data packet, which is discarded even if received after the buffering time window.

16. The method of claim 14, wherein if said missing data packet is not received during the buffering time window, said buffered data packets are forwarded irrespective of the missing data packet, which is delivered out of sequence even if received after the buffering time window.

17. The method of claim 14, wherein if said missing data packet is received during the buffering time window, said buffered data packets are reordered to their initial sequence order and forwarded in their initial sequence order.

18. The method of claim 17, wherein said reordering is based on sequence numbers of the packets contained in headers of the packets.

19. The method of claim 18, wherein said headers comprise General Packet Radio Service Tunneling Protocol (GTP) headers, Radio Link Control (RLC) headers, Logical Link Control (LLC) headers or Subnetwork Dependent Convergence Protocol (SNDCP) headers of the packets.

20. A network element comprising:
   first detecting unit configured to detect at least a delivery order attribute (DOA) as a parameter set for a transmission protocol type used for transmission of data packets;
   first deciding unit configured to decide whether said delivery order attribute parameter is set for said protocol type;
   first determining unit responsive to a positive decision result and configured to determine a traffic class of the transmitted data packets; and
   processing unit configured to process the transmitted data packets dependent on the determined traffic class.

21. The network element of claim 20, wherein said processing unit further comprises:
   second deciding unit configured to decide whether a determined traffic class is a predetermined traffic class; and
   discarding unit responsive to a positive result of said second deciding means and configured to discard received data packets which are received after subsequently sent data packets.

22. The network element of claim 20, wherein said processing unit further comprises:
   second deciding unit configured to decide whether a determined traffic class is a predetermined traffic class; and
   monitoring unit responsive to a negative result of said deciding means and configured to monitor a sequential relationship among received data packets;
   second detecting unit configured to detect whether a data packet is missing in the monitored sequence; and
   buffer unit responsive to the detection of a missing data packet and configured to buffer received data packets.

23. The network element of claim 22, wherein said processing unit further comprises:
   setting unit configured to set a buffering time window, during which time window received data packets are buffered.

24. The network element of claim 23, wherein said processing unit further comprises:
   checking unit configured to check whether the missing data packet is received during the buffering time window.

25. The network element of claim 24, wherein said processing unit further comprises:
   forwarding unit configured to forward, if said missing data packet is not received during the buffering time window, said buffered data packets irrespective of the missing data packet, and to discard the missing data packet even if received after the buffering time window.

26. The network element of claim 24, wherein said processing unit further comprises:
   reordering unit configured to reorder, if said missing data packet is received during the buffering time window, said buffered data packets to their initial sequence order, and to forward the buffered data packets in their initial sequence order.

27. The network element of claim 20, wherein said network element comprises a radio network controller (RNC) configured to control the transmission of data packets in the packet data network in a downlink direction.

28. The network element of claim 20, wherein said network element comprises a Gateway General Packet Radio Service Support Node (GGSN) configured to control the transmission of data packets in the packet data network in an uplink direction.

29. The method of claim 8, further comprising:
   deciding whether a determined traffic class is a predetermined traffic class; and
   if the traffic class is a predetermined traffic class discarding received data packets which are received after subsequently sent data packets.

30. The method according to claim 7, further comprising:
   deciding whether a determined traffic class is a predetermined traffic class; and
   if the determined traffic class is not a predetermined traffic class monitoring a sequential relationship among received data packets, detecting whether a data packet is missing in the monitored sequence, and in response to the detection of a missing data packet, buffering received data packets.

31. The method of claim 30, further comprising:
   setting a buffering time window, during which time window received data packets are buffered.

32. The network element of claim 21, wherein said network element comprises a radio network controller (RNC) configured to control the transmission of data packets in the packet data network in a downlink direction.

33. The network element of claim 22, wherein said network element comprises a radio network controller (RNC) configured to control the transmission of data packets in the packet data network in a downlink direction.

34. The network element of claim 23, wherein said network element comprises a radio network controller (RNC) configured to control the transmission of data packets in the packet data network in a downlink direction.

35. The network element of claim 24, wherein said network element comprises a radio network controller (RNC) configured to control the transmission of data packets in the packet data network in a downlink direction.

36. The network element of claim 25, wherein said network element comprises a radio network controller (RNC) configured to control the transmission of data packets in the packet data network in a downlink direction.

37. The network element of claim 26, wherein said network element comprises a radio network controller (RNC) configured to control the transmission of data packets in the packet data network in a downlink direction.

38. The network element of claim 21, wherein said network element comprises a Gateway General Packet Radio Service Support Node (GGSN) configured to control the transmission of data packets in the packet data network in an uplink direction.

39. The network element of claim 22, wherein said network element comprises a Gateway General Packet Radio Service Support Node (GGSN) configured to control the transmission of data packets in the packet data network in an uplink direction.

40. The network element of claim 23, wherein said network element comprises a Gateway General Packet Radio Service Support Node (GGSN) configured to control the transmission of data packets in the packet data network in an uplink direction.

41. The network element of claim 24, wherein said network element comprises a Gateway General Packet Radio Service Support Node (GGSN) configured to control the transmission of data packets in the packet data network in an uplink direction.

42. The network element of claim 25, wherein said network element comprises a Gateway General Packet Radio Service Support Node (GGSN) configured to control the transmission of data packets in the packet data network in an uplink direction.

43. The network element of claim 26, wherein said network element comprises a Gateway General Packet Radio Service Support Node (GGSN) configured to control the transmission of data packets in the packet data network in an uplink direction.

44. A network element comprising:
  first detecting means for detecting at least a delivery order attribute (DOA) as a parameter set for a transmission protocol type used for transmission of data packets;
  first deciding means for deciding whether said delivery order attribute parameter is set for said protocol type;
  first determining means, responsive to a positive decision result, for determining a traffic class of the transmitted data packets; and
  processing means for processing the transmitted data packets dependent on the determined traffic class.

* * * * *